Oct. 31, 1944.   W. WORTH   2,361,520
CLAMP
Filed Nov. 11, 1942   3 Sheets-Sheet 3
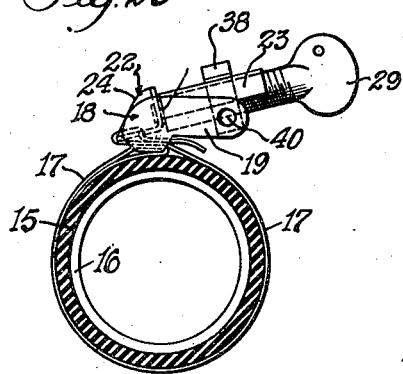
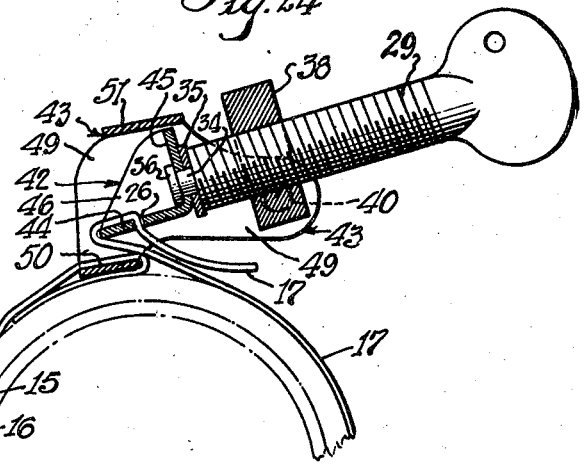
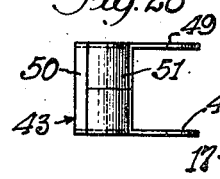
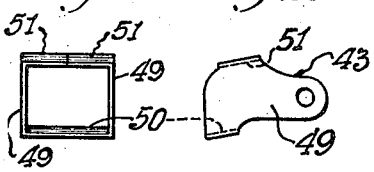
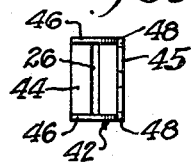
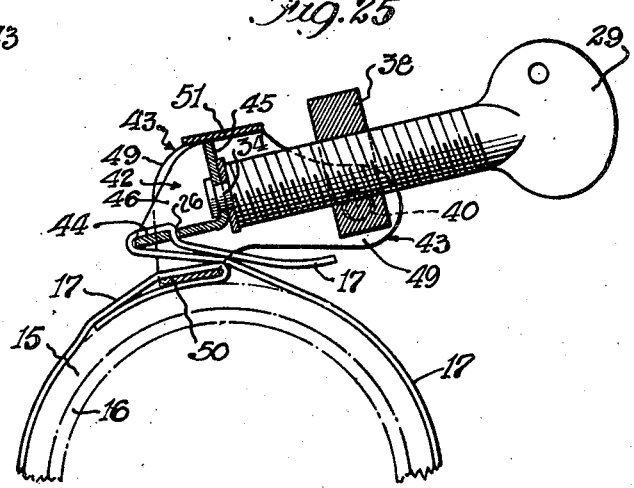
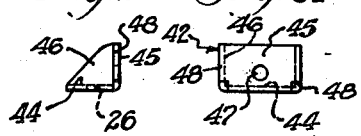
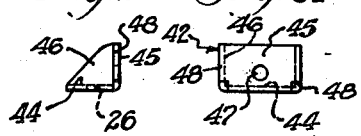
Inventor:
Weldon Worth
By: Frank J Schraeder Jr
Attorney Patented Oct. 31, 1944

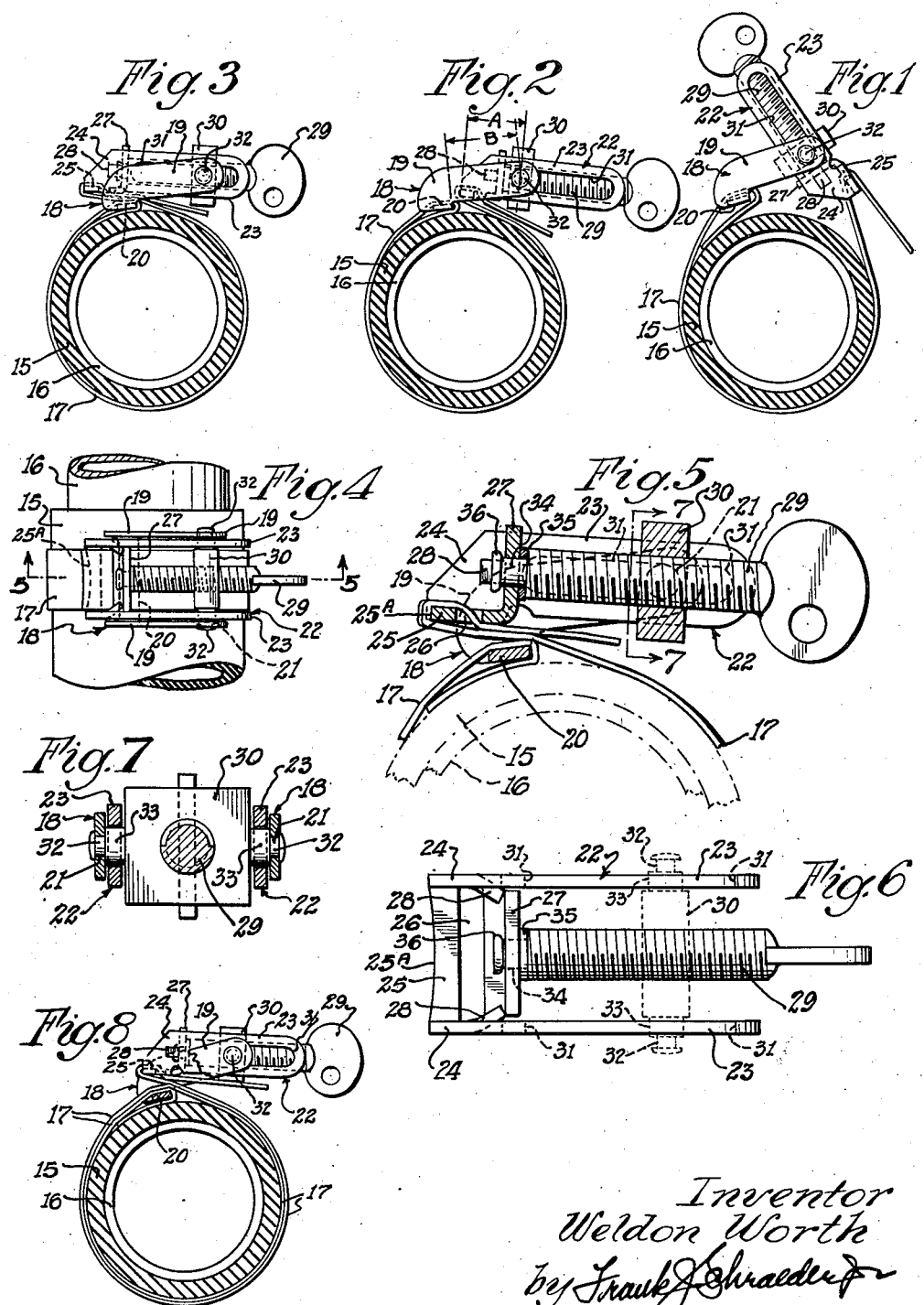

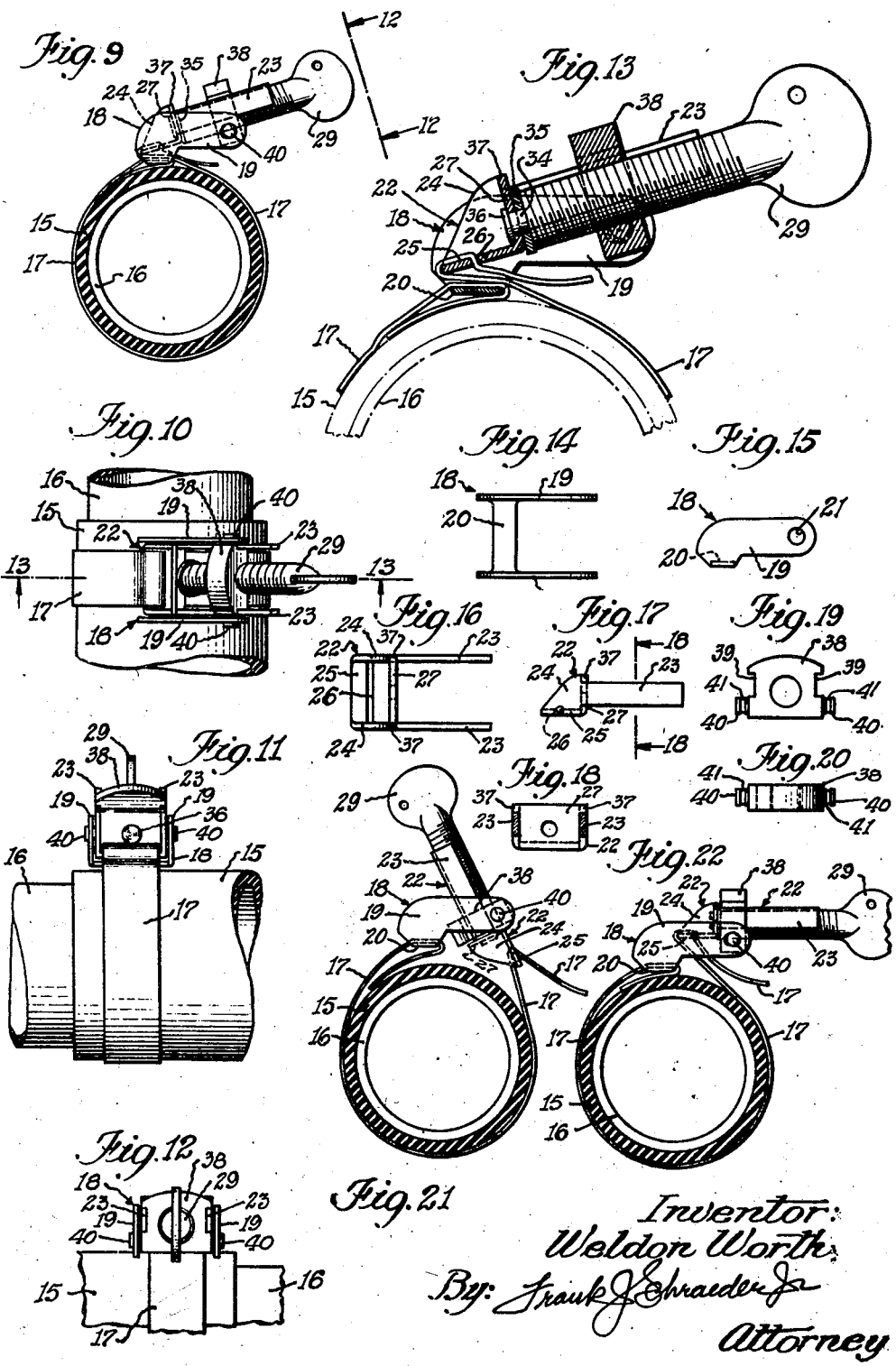

2,361,520

UNITED STATES PATENT OFFICE 2,361,520

CLAMP

Weldon Worth, Dayton, Ohio

Application November 11, 1942, Serial No. 465,290

16 Claims. (Cl. 24—19)

This invention relates generally to new and useful improvements in clamps and has particular reference to clamping devices for tightening the flexible band of clamps which are adapted for securing together a pair of telescopically connected members, as for example, a tubular metallic connection nipple or pipe and a hose.

One of the important features of my invention resides in the provision of a novel, durable and compact clamping device which can be readily adapted as an adjustable tightening instrumentality between a pair of hooked or looped ends of a flexible clamp band trained about a cylindrical member, such as a hose connection in a high pressure pipe line.

Another feature or object of my invention resides in the provision of a novel clamping device which can be readily adopted as a standard or universal adjustable securing instrumentality for any one of a series of flexible clamp bands of different lengths. Since no die-stamped deformations or perforations are present, or required, in the flexible metallic band, clamps for different diameters of hose may be readily made, as and when required, by simply cutting the desired approximate lengths of flexible band material from a coil of stock, and then assembling such lengths of bands with the standard clamping devices; hence, my invention obviates the necessity of carrying an extended line of assembled clamps of different diameters.

The clamping device comprises a saddle member having a cross bar and a pair of spaced parallel elongated members extending from the cross bar to which one end of the tightening band is hook-connected. An elongated band-tightening toggle member is positioned between the spaced elongated members of the saddle and supported on a nut having trunnions pivotally carried in the ends of the elongated saddle members; said toggle member includes a pair of spaced parallel extensions each having an elongated slot through which the nut trunnions extend and the spaced extensions are formed integrally with a band-connection head consisting of a slotted lateral wall to which the other end of the tightening band is hook-connected. The lateral band-engaged wall of the head is formed with a right-angularly bent screw-engagement wall which is resisted in outward movement by a pair of abutments formed integrally with the side walls of the spaced parallel extensions. A tightening screw extends through the nut into rotative engagement with the right-angularly bent screw-engagement wall.

Among the important features of my invention present in the above generally described clamping device as illustrated in the attached drawings are the following:

(a) The abutments for the screw-engaged wall are each disposed on a longitudinal center-line which intersects the axis of the nut trunnions in a plane which is coincident with the axis of the tightening screw, in other words, the longitudinal center lines of the elongated slots intersect the abutments and nut trunnions in a plane which is coincident with the axis of the tightening screw. This plane-alignment of the nut trunnions and the band-connection head abutments with the elongated slots of the tightening head extensions and the axis of the tightening screw provides a strong and operatively efficient clamping device for flexible band clamps of the type herein disclosed.

(b) When the tightening screw is retracted to its extreme position, as shown in Figs. 1 and 2, the horizontal distance from the center of the nut trunnions to the outer edge of the band-connection wall is less than the horizontal distance from the center of the nut trunnions to the inner edge of the band-connection cross bar of the saddle member. This relative dimensional arrangement permits the toggle-tightening movement illustrated in Figs. 1 and 2 of the drawings.

With the above and other objects in view, my invention consists in the novel combination, construction and arrangement of the members and parts shown in preferred embodiment in the attached drawings, described in the following specification, and particularly pointed out in the appended claims.

In the drawings:

Fig. 1 is a cross-section through a hose connection showing a side elevation of a clamp embodying my invention; the clamping device being shown in the initially tightened position;

Fig. 2 shows the clamping device in toggle-tightened position wherein the clamp band has been adjusted into an advanced tightened position;

Fig. 3 shows the clamping device in a still further advanced tightened position secured by the rotation of the tightening screw;

Fig. 4 is a plan view of the clamping device shown in Fig. 3;

Fig. 5 is an enlarged longitudinal section through the clamp device taken on line 5—5 of Fig. 4 with portions of the clamp band and the clamped members broken away;

Fig. 6 is a plan view of the tightening member shown in Fig. 5;

Fig. 7 is a cross-section taken on line 7—7 of Fig. 5; and

Fig. 8 illustrates the use of my clamping device with a single band wound about the hose connection in doubled-arrangement.

Fig. 9 is a cross-section through a hose connection showing a side elevation of a modification of my clamp invention in tightened position;

Fig. 10 is a plan view of the clamp shown in Fig. 9;

Fig. 11 is an end view of the clamp assembly shown in Fig. 9;

Fig. 12 is an opposite end view of the clamp device shown in Fig. 11;

Fig. 13 is an enlarged longitudinal section through the clamp device taken on line 13—13 of Fig. 10 with portions of clamp band and the clamped members broken away;

Figs. 14 and 15 show respectively plan view and side elevation of the saddle member;

Figs. 16 and 17 show respectively plan view and side elevation of the adjustable movable tightening member;

Fig. 18 is a vertical section taken on line 18—18 of Fig. 17;

Figs. 19 and 20 show respectively face view and plan view of the nut;

Fig. 21 shows the assembled position of the clamp members shown in Figs. 9 to 13 inclusive just after the initial tightening movement;

Fig. 22 shows the clamp tightening member moved into toggled tightening position;

Fig. 23 is a view similar to that shown in Fig. 9 but showing the clamp in an advanced tightened position;

Fig. 24 is a longitudinal section similar to that shown in Fig. 13, but showing another modified form of my invention;

Fig. 25 is a longitudinal section of the modified form of my invention shown in Fig. 24 but showing the clamp device in advanced tightened position;

Figs. 26, 27 and 28 show respectively side elevation, end view and plan view of the modified saddle member; and Figs. 29, 30 and 31 show respectively side elevation, plan view and end view of the flexible band connection head for the tightening screw.

In the drawings, like reference numerals indicate like or corresponding members or parts.

My clamp invention is shown in the attached drawings as applied to a hose 15 conected to the end of pipe 16.

In the illustrations, the clamp band 17 consists of an imperforated strip of flexible metal of uniform width and cross section throughout the entire length.

Referring to the device as shown in Figs. 1 to 8 inclusive:

The clamping device includes a saddle member 18 which consists of a pair of elongated laterally spaced parallel sides 19 connected together with an integral cross-bar or transverse band-connection wall 20 disposed in a lateral plane slightly below that of the parallel sides 19 and which cross-bar 20 is preferably located slightly rearwardly of the front ends of the sides 19. The opposed lateral faces of the cross-bar or band-connection wall 20 are disposed substantially right-angularly to the vertically disposed faces of the sides 19. The rear ends of the sides 19 are provided with laterally aligned openings 21.

The adjustably movable band-tightening member 22 consists of a pair of laterally spaced parallel nut-supporting and guiding extensions 23 formed integrally with a head which includes the upright side walls 24 formed integrally with the extensions 23, a lateral integral band-connection wall 25 provided with a transversely disposed slot 26, and an integral transverse tightening-screw engagement wall 27 constituting an upwardly right-angularly bent portion of the lateral connection wall 25.

The screw-engagement wall 27 extends close to the inner faces of the integral extensions 23 and is in abutment with a pair of abutment lugs 28 which are partially cut and pressed out inwardly from the side walls 24 for engagement with the outer face of the screw-engaged wall 27.

The abutments 28 function as side supports for the upwardly bent screw-engaged wall 27 when pressure is exerted against such wall by the band-tightening screw 29.

The tightening screw 29 has threaded engagement with a nut 30 which is slidably carried in the elongated slots 31 of the spaced extensions or guides 23.

The nut 30 is formed, at the centers of its sides, with a pair of oppositely disposed transversely aligned pivotal trunnions 32 which are arranged for pivotal support within the openings 21 of the saddle member 18. Each trunnion 32 is provided with a slightly enlarged portion 33 which is guided within the slot 31 of one of the two spaced extensions 23. The axis of the trunnions 32 extends transversely to and intersects the axis of the tightening screw 29. The outer ends of the trunnions are peened or rivet-headed to resist displacement of the trunnions from their support in the openings 21 of the saddle 18.

The tightening screw 29 is provided with an end portion 34 of slightly decreased diameter which is rotatably supported in the screw-engagement wall 27 and in the hard steel washer 35 which is interposed between the wall 27 and the shouldered end of the tightening screw as a wear-resistant member. To prevent longitudinal displacement of the tightening screw 29 from the wall 27, its end is preferably peened, as of 36.

In assembling the clamping device for application to a cylindrical connection, such as, for example, the hose connection illustrated in the attached drawings, one end portion of a suitable length of the flexible band 17 is passed over and bent under the cross-bar or transverse band-connection wall 20 of the saddle 18 in hook or loop form, and the opposite end of the band 17 is passed over the tightening member band-connection wall 25 and through the slot 26 and bent back to form a hook or loop connection.

The assembly may be made with the screw 29 somewhat advanced through the nut so that retraction of the screw to the position illustrated in Fig. 1 effects an initial tightening of the band 17 and the connected clamp parts are ready for further partial tightening which is accomplished by partial bodily rotation of the tightening member assembly as a toggle about the nut trunnions 32 to bring the assembly to the position shown in Fig. 2 wherein the flexible band 17 is drawn into a partially tightened engagement with the hose connection.

A rotative advance of the tightening screw 29 will then cause its operatively associated tightening member head, to which it is rotatably connected in the wall portion 27, to move forwardly, thereby having the effect of forcibly moving the looped ends of the flexible band 17 in opposite directions to effect final tightening of the band 17 around the hose connection, as illustrated in Figs. 2 and 3.

Other important features of my invention, which will now be more readily apparent, include the following:

The screw-adjustable band-tightening member is operatively pivotally interengaged with the band-connection saddle member through a nut and its trunnions which are slidably movable in the elongated slots of the band-tightening member and pivotally connected to the saddle member. Oppositely exerted clamp-tightening forces properly move the opposed ends of the flexible clamp band in opposite aligned directions, one band end over the other, with practically no gap between them.

The extended spaced parallel extensions 23 of the screw-adjustable band-tightening member provide a rigid support for the nut, which is slidably carried thereon, and resist any tendency of the nut to rotate about the longitudinal axis of the tightening screw. The extensions 23, through their engagement with the nut trunnions, also function as supports for the band-connection wall 25 during the tightening rotation of the screw, since these extensions 23 resist the tendency of the wall 25 to bend at its junction with the screw-engaged wall 27.

In the tightening operation of the clamp, the head and the side extensions of the screw-actuated band-tightening member are constantly guided by the nut trunnions which are slidably disposed in the slots of the spaced extensions of the tightening member and pivotally supported in the extended sides of the saddle member so these two members are, during such tightening operation, retained in proper relative alignment, however, the desired relative vertical angular movement between these members is readily afforded through their pivotal interconnection, which, to an advantage, is located at a spaced distance from their points of connection with the ends of the flexible band.

The clamp is particularly adapted for securing a tight hose connection in a high pressure pipe line because the clamping device is designed to operate with an imperforated flexible metal band of uniform cross-section throughout its entire length.

Attention is called to the band-engaging head of the band-tightening member 22, and particularly to the arcuate outer edge 25A of the lateral band-connection wall 25 which serves, when the device is in tightened position, to impose a transverse arcuate bend in the band portion which is in pressure contact with such arcuate edge 25A, to thus increase the frictional resistance to any tendency of the slippage of the band at such point of connection. To further insure a more secure fastening of the clamp band in such head, the slot 26 is preferably only slightly wider than the thickness of the clamp band so that when the tightening screw is rotated to an advanced tightening position, four substantially right-angular bends will be imposed in the looped connection of the band, one of them being a reverse bend, which, as in evident from Figs. 3 and 5, serves to positively secure the looped end of the band against slippage in the slotted head.

Although experienced installers of the clamps disclosed herein will readily ascertain the proper required lengths of bands for hose connections of different diameters, it is not necessary to precut the clamp band to predetermined lengths since a portion of the free end of a coiled stock of the band material may, while the clamping device is untoggled, be readily pulled through the slot 26 in the connection head of the tightening member and thence passed over and under the cross-bar 20, in hooked form, in the manner generally shown in Fig. 1 and thereafter the effective used portion of the band may be severed from the coiled stock portion.

As heretofore pointed out, when the tightening screw is retracted to its extreme position, as shown in Figs. 1 and 2, the horizontal distance A from the center of the nut trunnions to the outer edge of the band-connection wall 25 is less than the horizontal distance B from the center of the nut trunnions to the inner edge of the band-connection cross bar 20 of the saddle member 18. This relative dimensional arrangement permits the toggle-tightening movement illustrated in Figs. 1 and 2 of the drawings.

For practical purposes, the difference between the dimensions A and B is only about three times the thickness of the clamp band 17.

The modified clamping device, as shown in Figs. 9 to 23 inclusive, includes a saddle member 18 which consists of a pair of elongated, laterally spaced parallel sides 19 connected together with an integral cross-bar or transverse band-connection wall 20 disposed in a lateral plane slightly below that of the parallel sides 19 and which cross-bar 20 is preferably located slightly rearwardly of the front ends of the sides 19. The opposed lateral faces of the cross-bar or band-connection wall 20 are disposed substantially right-angularly to the vertically disposed faces of the sides 19. The rear ends of the sides 19 are provided with laterally aligned openings 21.

The adjustably movable band-tightening member 22 consists of a pair of laterally spaced parallel nut-supporting extensions or guides 23 formed integrally with a head which includes the upright side walls 24 formed integrally with the extensions 23, a lateral integral band-connection wall 25 provided with a transversely disposed slot 26, and an integral transverse tightening-screw engagement wall 27 constituting an upwardly right-angularly bent portion of the lateral connection wall 25.

The screw-engagement wall 27 includes a pair of short, oppositely disposed integral extensions 37 disposed within the angular seats formed by the upstanding rear edges of the head side walls 24 and the adjacent upper edge portions of the integral extensions 23. The side walls 24 constitute abutments for the screw-engagement wall 27.

The tightening screw 29 has threaded engagement with the nut 38 which is provided with a pair of oppositely disposed inwardly disposed side recesses 39 for slidable support therein of the spaced extensions or guides 23.

The nut 38 is also formed, at the lower ends of its sides, with a pair of oppositely disposed pivotal trunnions 40 which are arranged for pivotal support within the openings 21 of the saddle member 18. Each trunnion 40 is preferably provided with a shallow annular groove 41 of a width slightly greater than the thickness of the saddle sides 19, whereby the trunnions 40 may be slightly eccentrically shifted relatively to the center of the openings 21, when the clamping device is tightened, to thereby resist forceful displacement of the trunnions from their support in the openings 21 of the saddle 18.

The tightening member engagement portion 34, of the tightening screw 29, is of slightly decreased diameter and is rotatably supported in the screw-engagement wall 27 and the hard steel washer 35 which is interposed between the wall 27 and the shouldered end of the tightening screw as a wear-resistant and to distribute the pressure of the screw 29 over a larger area of the wall 27. To prevent longitudinal displacement of the tightening screw 29 from the wall 27, its end is preferably peened, as at 36.

In assembling the clamping device shown in Figs. 9 to 23 inclusive, for application to a cylindrical connection, such as, for example, the hose connection illustrated in the attached drawings, one end portion of a suitable length of the flexible band 17 is passed over and bent under the cross-bar or transverse connection wall 20 of the saddle 18 in hook or loop form, and the opposite end of the band 17 is passed over the tightening member wall 25 and through the slot 26 and bent back to form a hook or loop connection.

The assembly may be made with the screw 29 somewhat advanced through the nut 38 so that a retraction of the screw to the position illustrated in Fig. 21 effects an initial tightening of the band 17 and the connected clamp parts are then ready for further partial tightening which is accomplished by partial bodily rotation of the tightening member assembly as a toggle about the nut trunnions 40 to bring the assembly to the position shown in Fig. 22, wherein the flexible band 17 is drawn into a partially tightened engagement with the hose connection.

A rotative advance of the tightening screw 29 will then cause its operatively associated tightening member head, to which it is rotatably connected in the head plate portion 27, to move forwardly, thereby having the effect of forcibly moving the looped ends of the flexible band 17 in opposite directions to thus tighten the band 17 around the hose connection, as shown in Fig. 9.

The clamping device is shown in an advanced tightened position in Fig. 23.

Another modified form of my clamping device is illustrated in Figs. 24 to 31 inclusive.

Fig. 24 shows the modified clamping device in partially tightened position, and Fig. 25 shows the same device in an advanced tightened position.

As shown in Figs. 24 and 25, the modifications consist chiefly in structural changes in the screw-actuated tightening head, generally indicated by numeral 42, and in the saddle member, generally indicated by numeral 43.

In the modified band-tightening connection head 42, the above-described spaced guide extensions 23 are eliminated and this modified head 42 consists of bent L-shaped portions 44 and 45.

The band-connection portion 45 is provided with the slot 26 and right-angularly bent end portions 46.

The screw-connection portion 45 is provided with an opening 47 for the connection portion 34 of the screw 29. It will be noted that the wall portion 45 is also formed with extended side portions 48 arranged for abutment with the vertical ends of the bent end portions 46 whereby the wall 45 is braced at its ends 48 by the abutment portions 46.

Since the guides 23 have been dispensed with in this modified design, the recesses 39 in the nut 38 are unnecessary.

The modified saddle member 43 consists of the spaced parallel sides 49, the integral transversely disposed band-connection wall 50, and the oppositely right-angularly bent upper abutment guide wall portions 51.

The clamp-tightening operation of the modified clamping device shown in Figs. 24 and 25 is similar to that above-described for the clamp illustrated in Figs. 9 to 23 inclusive. After the described initial tightening by the retraction of the tightening screw 29 followed by the partial bodily rotation of the tightening member assembly as a toggle about its supporting nut trunnions 40, the advanced final tightening of the clamp band 17 is then accomplished by the rotation of screw 29 and during such final tightening the band-tightening head 42 will be guided by the saddle sides 49 into locked engagement with the inner faces of the lateral saddle portions 51.

The advanced successive final tightening movements attained by the rotation of the tightening screw 29 are readily apparent from the relative positions of the parts in Figs. 24 and 25.

In the appended claims, unless otherwise more specifically defined, the various parts and members, illustrated in the attached drawings and specified in the foregoing specification, are defined as follows:

The saddle member or band-connection member is identified by either numeral 18 or 43;

The band-tightening instrumentality consists of the tightening screw 29, a nut 30 or 38 and a band-tightening member 22 or 42;

The band-tightening member 22 includes the band-connection head and its spaced parallel extensions 23.

In the clamp illustrated in Figs. 24 and 25, the band-tightening member consists only in the band-tightening connection head 42.

I claim:

1. A clamping device for tightening a flexible band around a form, said device including a saddle member having a cross bar with which a hooked end of the band is engaged and having a pair of elongated spaced sides extending therefrom, a nut having trunnions pivotally supported on said saddle sides, a screw extending through said nut, the axis of said trunnions intersecting the axis of said screw, and a band-tightening member swivelly carried by said screw and having an integral band-connection head with which said screw is permanently and rotatably engaged and to which the other hooked end of the band is connected, said tightening member band-connection head having a pair of laterally spaced extensions each having an elongated slot into which said nut trunnions extend, and said tightening member being dimensioned to swing with the nut and the screw as a toggle about said pivotal trunnions of said nut and to pass said band-connection head between said spaced saddle sides past the saddle cross bar when the screw is in retracted position in said nut, thereby effecting a partial tightening of the band, the advance rotation of said screw through said nut then acting to move the tightening member in the direction to increase the tension of the band.

2. A clamping device for tightening a flexible band around a form, said device including a saddle member having a cross bar with which a hooked end of the band is engaged and having a pair of elongated spaced sides extending therefrom, a nut having trunnions for pivotally supporting said nut on said saddle sides, a screw extending through said nut, and a band-tightening member swively carried by said screw and having an L-shaped portion to one leg of which said screw is rotatably connected and to the other leg of which the other hooked end of the band is connected, said tightening member having a pair of laterally spaced extensions each having an elongated slot therein into which said nut trunnions extend, said tightening member having a pair of abutments in engagement with the leg of said L-shaped portion which is engaged by said screw and being dimensioned to swing with the nut and the screw as a toggle about said pivotal trunnions of said nut and to pass said L-shaped portion between said spaced saddle sides past the saddle cross bar when the screw is in retracted position in the nut, thereby effecting a partial tightening of the band, the advance rotation of the screw through the nut then acting to move said tightening member in the direction to increase the tension of the band, and said tightening member, when thus advanced, being overlapped upon the cross bar of the saddle, thus locking the screw and nut against rotation about the pivotal mounting of the latter.

3. A clamping device for tightening a flexible band around a form, said device including a saddle member having a cross bar with which a hooked end of the band is engaged and having a pair of elongated spaced side members extending therefrom, a nut having trunnions pivotally suported on said saddle sides, a screw extending through the nut, the axis of said screw extending transversely to and intersecting the pivotal axis of said nut trunnions, and a band-tightening member swively carried by said screw and having an L-shaped portion to one leg of which said screw is rotatably connected and to the other leg of which the other hooked end of the band is connected, said L-shaped portion having a pair of laterally spaced extensions each having an elongated slot therein into which said trunnions extend, a pair of abutments, one on each of said extensions, in engagement with said screw-engaged leg, the axis of said screw intersecting the axis of said nut trunnions and being disposed in a plane passing through said abutments and through the longitudinal center-lines of said elongated slots, the screw and nut being initially disposed with the tightening member at the opposite side of said pivotal axis from the saddle cross bar and with the screw advanced through the nut, whereby retraction of said screw effects an initial tightening of the band, said tightening member being dimensioned to be then swung as a toggle about the pivotal mounting of the nut and to pass between said spaced sides of said saddle past said cross bar thereof with the screw in retracted position, thereby effecting a further tightening of the band, the advance rotation of the screw through the nut then acting to move said tightening member in the direction to increase the tension of the band, and said tightening member, when thus advanced, being overlapped upon the cross bar of the saddle, thus locking the screw and nut against rotation about the pivotal mounting of the latter.

4. In a flexible band clamp having a band-connection member, to which one end of the band is connected, a band-tightening instrumentality comprising a nut having oppositely disposed aligned trunnions pivotally mounted on spaced portions of said band-connection member, a tightening screw having threaded connection with and extending through said nut, the axis of said screw intersecting the axis of said trunnions, a band-tightening member having a wall disposed transversely to the axis of said screw with which one end of said screw is rotatably connected, said transverse screw-engaged wall having an integral band-connection wall, disposed relatively angularly to said screw-engaged wall and provided with a slot for hooked connection therein of the other end of the band, said band-connection wall having right-angularly bent laterally spaced side walls with integral elongated extensions each provided with an elongated slot into which said trunnions extend, and each of said side walls having an integral abutment in engagement with said screw-engaged transverse wall, said abutments being disposed in a plane which is coincident with the axis of said screw and the longitudinal center-lines of said elongated slots.

5. In a flexible band clamp having a band-connection member, to which one end of the band is connected, a band-tightening instrumentality comprising a nut having oppositely disposed aligned trunnions pivotally mounted on spaced portions of said band-connection member, a tightening screw having threaded connection with and extending through said nut, the axis of said screw intersecting the axis of said trunnions, a band-tightening member having a wall disposed transversely to the axis of said screw with which one end of said screw is rotatably connected, said transverse screw-engaged wall having an integral band-connection wall provided with a slot for hooked connection therein of the other end of the band and right-angularly bent laterally spaced side walls with integral elongated extensions each provided with an elongated slot into which said trunnions extend, and each of said side walls having an integral abutment in engagement with said screw-engaged transverse wall, said abutments being disposed in a plane which is coincident with the axis of said screw and the longitudinal center-lines of said elongated slots.

6. In a clamping device for tightening a flexible band around a form, said device including a saddle member having a cross bar with which a hooked end of the band is engaged and having spaced elongated sides integral with and extending from the cross bar beyond said hooked end of the band, a band-tightening instrumentality comprising a nut having trunnions pivotally supported on said members, a screw extending through said nut, the longitudinal axis of said screw transversely intersecting the pivotal axis of said nut, and a band-tightening member swively carried by said screw, said tightening member having a band-connection head with which one end of said screw is rotatably engaged and having a slot in which the other hooked end of the band is engaged, said head having a pair of laterally spaced elongated extensions each provided with an elongated slot into which said nut trunnions extend, the longitudinal axis of said screw and the axis of said trunnions being disposed in a plane which is coincident with the longitudinal center-lines of said elongated slots, said screw and said nut being initially disposed with said tightening member at the opposite side of the axis of the pivotal trunnions from the saddle cross bar, whereby rotation of said tightening member with said nut and said screw as a toggle about said pivotal axis of said trunnions carries the slotted portion thereof between said sides of said saddle and past said cross bar, effecting a partial tightening of the band and forming a reverse bend in its hooked end adjacent the slot, the tightening member being further adjustable by advance of the screw to increase the tension of the band.

7. A device for tightening a flexible band about a hose connection, said device comprising a band-connection member with which a hooked end of the band is connected, a nut having trunnions pivotally supported on said connection member, a band-tightening member having a pair of laterally spaced elongated portions each provided with an elongated slot into each of which one of said trunnions extends respectively, said elongated portions being connected with an integral transverse portion having a slot through which the other end of the band is hook-connected, a screw extending through said nut, said transverse portion having a relatively angularly bent portion to which one end of the screw is rotatably connected, and an abutment on each of said laterally spaced elongated portions resisting the tightening pressure of said screw against said angularly bent screw-engaged portion, the axis of said screw intersecting the axis of said nut trunnions and being disposed in a plane passing through said abutments and through the longitudinal center-lines of said elongated slots.

8. In a clamping device for tightening a flexible band around a form, said device comprising a band-connection member having a cross bar with which a hooked end of the band is engaged and having spaced parallel elongated extensions extending from the cross bar beyond said hooked end of the band, a nut having a pair of trunnions pivotally supported on said extensions, a screw extending through said nut, the longitudinal axis of said screw transversely intersecting the pivotal axis of said trunnions, and a band-tightening member provided with an L-shaped band-connection head having a horizontal leg to which the other hooked end of the band is connected, the other leg of said L-shaped head extending transversely to the axis of said screw and constituting a vertical leg to which one end of the screw is rotatably connected, said horizontal leg having right-angularly bent ends constituting transversely spaced parallel sides extending beyond said nut, said parallel sides each having an abutment in engagement with said vertical leg and each of said sides having an elongated slot through which one of said nut trunnions extends, the axes of said screw and nut trunnions being disposed in a plane passing through said abutments, said band-tightening member head being movable toward and from said nut by rotation of said screw and the distance between the outer edge of said horizontal leg and the pivotal axis of said trunnions being less, when the screw is in retracted position, than the distance between the cross bar of said band-connection member and said pivotal axis of said trunnions, whereby the tightening member can be swung as a toggle about the axis of said trunnions when the screw is retracted, thereby effecting a partial tightening of the band, the band-tightening member being then adjustable by the advance of the screw to move said L-shaped head further from the pivotal axis of said trunnions whereby said cross bar locks the toggled band-tightening member against release.

9. In a clamping device as defined in claim 3, said other leg of said L-shaped portion having an arcuate edge whereby the portion of the flexible band in contact with such arcuate edge is bent into arcuate form to provide increased frictional resistance against slippage of the hooked band end in its connection with said L-shaped portion.

10. In a band-tightening instrumentality as defined in claim 5, said slotted band-connection wall having its outer edge of a configuration deviating from a straight line whereby the portion of the flexible band in contact with such edge is caused to approximate such configuration, upon the tightening of the band, to provide increased frictional resistance against slippage of the hooked band end in its connection with said band-connection wall.

11. In a device as defined in claim 7, and integral transverse portion having its outer edge of a configuration deviating from a straight line whereby the cross-section of the portion of the flexible band which is in contact with such edge is caused, upon tightening of the band, to approximate such configuration to provide increased frictional resistance against slippage of the hooked end of the band from its connection with said transverse portion of said band-tightening member.

12. In a clamping device as defined in claim 1 said band having its medial portion trained about said form in superposed convolutions.

13. In a clamping device as defined in claim 3 said band having its medial portion trained about said form in superposed convolutions.

14. In a clamping device as defined in claim 7 said band having its medial portion trained about said form in superposed convolutions.

15. A band-tightening instrumentality for a flexible band clamp having a band-connection member to which one end of the band is connected and including a support having oppositely disposed aligned trunnions pivotally mounted on spaced portions of said band-connection member; said band-tightening instrumentality comprising a tightening screw having threaded connection with and extending through said support, the axis of said screw intersecting the axis of said trunnions, a second band-connection member having a wall disposed transversely to the axis of said screw with which one end of said screw is rotatably connected, said transverse screw-engaged wall having an integral band-connection wall, disposed relatively angularly to said screw-engaged wall and provided with a slot for hooked connection therein of the other end of the band, said band-connection wall having right-angularly bent laterally spaced side walls with integral elongated extensions each provided with an elongated slot into which said trunnions extend, and each of said side walls having an integral abutment in engagement with said screw-engaged transverse wall, said abutments being disposed in a plane which is coincident with the axis of said screw and the longitudinal center-lines of said elongated slots.

16. A band-tightening instrumentality for a clamping device for tightening a flexible band around a form including a saddle member having a cross bar with which a hooked end of the band is engaged and having spaced elongated sides extending from the cross bar beyond said hooked end of the band and a nut having trunnions pivotally supported on said members; said band-tightening instrumentality comprising a screw extending through said nut, the longitudinal axis of said screw transversely intersecting the pivotal axis of said nut, and a tightening member swivelly carried by said screw, said tightening member having a band-connection head with which one end of said screw is rotatably engaged and having a slot in which the other hooked end of the bar is engaged, said head having a pair of laterally spaced elongated members each provided with an elongated slot into which said nut trunnions extend, the longitudinal axis of said screw and the axis of said trunnions being in a plane which is coincident with the longitudinal center-lines of said elongated slots, the screw and nut being initially disposed with the tightening member positioned at the opposite side of the axis of the pivotal trunnions from the saddle cross bar, whereby rotation of said tightening member with the nut and screw as a toggle about said pivotal axis of said trunnions carries the slotted portion thereof between the side members of the saddle and past the cross bar, effecting a partial tightening of the band and forming a reverse bend in its hooked end adjacent the slot, the tightening member being further adjustable by advance of the screw to increase the tension of the band.

WELDON WORTH.